US012206173B1

(12) United States Patent
West et al.

(10) Patent No.: US 12,206,173 B1
(45) Date of Patent: Jan. 21, 2025

(54) DUAL MODE OMNI / DIRECTIONAL SECTORED ARRAY

(71) Applicant: Rockwell Collins, Inc., Cedar Rapids, IA (US)

(72) Inventors: James B. West, Cedar Rapids, IA (US); Jiwon L Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 197 days.

(21) Appl. No.: 17/969,502

(22) Filed: Oct. 19, 2022

(51) Int. Cl.
*H01Q 19/13* (2006.01)
*H01Q 3/20* (2006.01)

(52) U.S. Cl.
CPC ............. *H01Q 19/138* (2013.01); *H01Q 3/20* (2013.01)

(58) Field of Classification Search
CPC .... H01Q 19/138; H01Q 3/20; H01Q 21/0025; H01Q 3/25-26; H01Q 1/2833; H01Q 21/0075; H01Q 1/246
See application file for complete search history.

(56) References Cited

U.S. PATENT DOCUMENTS 2,724,054 A * 11/1955 Yevick ................. H01Q 19/138 343/778
3,028,591 A * 4/1962 Mattingly .............. H01Q 21/29 343/893
3,725,937 A * 4/1973 Schreiber .............. G01S 13/422 342/155
3,763,493 A * 10/1973 Shimada .................. H01Q 5/45 343/837
3,852,748 A * 12/1974 Stark ........................ H01Q 3/46 343/753

(Continued)

FOREIGN PATENT DOCUMENTS

EP 3560111 A4 12/2020
WO WO-2014019524 A1 * 2/2014 ......... H01Q 13/0208

OTHER PUBLICATIONS

Alieldin, et al., (2018). A reconfigurable broadband dual-mode dual-polarized antenna for sectorial/omnidirectional mobile base stations. Progress in Electromagnetics Research-pier, 163, 1-13.

(Continued)

*Primary Examiner* — Hai V Tran
*Assistant Examiner* — Jordan E. DeWitt
(74) *Attorney, Agent, or Firm* — Suiter Swantz IP

(57) ABSTRACT

An antenna includes multiple pillbox antenna structures arranged in a circle to cover the horizon. Each pillbox antenna structures includes a reflector configured to widen the resulting beam so that neighboring pillbox antenna structures produce beams that interact to more fully cover the horizon. A feed layer may include transmit/receive modules that are configured to apply amplitude and phase modulations to input signals for each pillbox antenna structure. Amplitude and phase modulations enable constructive and destructive interference between neighboring pillbox antenna structures to enhance the resulting beam or create nulls to exclude interfering signals. Sets of pillbox antenna structures may be stacked and angularly offset to correct crossover sectors. Alternatively, or in addition, sets of pillbox antenna structures may be adapted to operate in different, distinct frequency bands.

19 Claims, 8 Drawing Sheets

(56) References Cited

U.S. PATENT DOCUMENTS

| | | | | |
|---|---|---|---|---|
| 4,100,548 | A * | 7/1978 | Hemmi | H01Q 19/138 343/837 |
| 4,604,624 | A * | 8/1986 | Amitay | H01Q 19/195 343/756 |
| 4,825,222 | A * | 4/1989 | Butcher | H01Q 17/001 343/781 P |
| 5,373,299 | A * | 12/1994 | Ozaki | H01Q 21/0075 333/116 |
| 6,041,232 | A * | 3/2000 | Jennings, III | H01Q 19/13 455/422.1 |
| 6,140,972 | A * | 10/2000 | Johnston | H01Q 25/00 343/893 |
| 6,320,553 | B1 * | 11/2001 | Ergene | H01Q 25/007 343/781 P |
| 8,160,569 | B1 * | 4/2012 | VanLaningham | H04W 64/006 455/424 |
| 8,514,130 | B1 * | 8/2013 | Jensen | H01Q 19/32 342/367 |
| 8,581,794 | B1 * | 11/2013 | Shor | H01Q 21/28 343/777 |
| 8,604,987 | B1 * | 12/2013 | Doane | H01Q 21/061 343/893 |
| 8,842,050 | B2 | 9/2014 | Livneh et al. | |
| 9,478,865 | B1 * | 10/2016 | Willis | H01Q 21/064 |
| 9,716,309 | B1 * | 7/2017 | ElSallal | H01Q 13/085 |
| 9,729,213 | B2 * | 8/2017 | Hartenstein | H01Q 19/22 |
| 9,749,889 | B2 | 8/2017 | Lee et al. | |
| 9,847,582 | B2 * | 12/2017 | Moulder | H01Q 21/28 |
| 9,991,607 | B1 * | 6/2018 | West | H01Q 13/0275 |
| 10,418,723 | B1 * | 9/2019 | Livadaru | H01Q 1/38 |
| 10,826,180 | B2 | 11/2020 | Hong et al. | |
| 10,910,712 | B2 | 2/2021 | Washakowski et al. | |
| 11,183,773 | B2 * | 11/2021 | Fried | H01Q 1/1228 |
| 11,329,375 | B1 | 5/2022 | West et al. | |
| 2005/0168391 | A1 * | 8/2005 | Ratajczak | H01Q 9/28 343/773 |
| 2005/0219126 | A1 * | 10/2005 | Rebeiz | H01Q 25/008 343/700 MS |
| 2010/0066590 | A1 * | 3/2010 | Brown | H01Q 3/2605 342/147 |
| 2010/0149061 | A1 * | 6/2010 | Haziza | H01Q 13/0233 343/781 R |
| 2012/0235858 | A1 * | 9/2012 | Dougherty | G01S 7/4026 342/169 |
| 2014/0062823 | A1 | 3/2014 | Shor et al. | |
| 2014/0354499 | A1 * | 12/2014 | Legay | H01Q 3/26 343/778 |
| 2015/0215011 | A1 * | 7/2015 | Hartenstein | H01Q 13/085 375/267 |
| 2015/0340755 | A1 * | 11/2015 | Hartenstein | H04W 84/12 343/702 |
| 2016/0301141 | A1 * | 10/2016 | Del Castillo | H01Q 11/10 |
| 2017/0110790 | A1 * | 4/2017 | Kim | H01Q 21/205 |
| 2017/0162943 | A1 * | 6/2017 | Legay | H01Q 15/0033 |
| 2021/0305712 | A1 * | 9/2021 | Pang | H01Q 9/16 |
| 2021/0313687 | A1 * | 10/2021 | Choi | H01Q 3/34 |
| 2021/0341594 | A1 * | 11/2021 | Lee | G01S 13/66 |
| 2024/0072420 | A1 * | 2/2024 | Hou | H01Q 15/14 |

OTHER PUBLICATIONS

Nibir, et al., (2019). Multiband antenna using stacked series array for Ka-Band application. Bulletin of Electrical Engineering and Informatics.

* cited by examiner

DUAL MODE OMNI / DIRECTIONAL SECTORED ARRAY

BACKGROUND

Traditional omni-networked communication typically operates in a single frequency band, is vulnerable to jammer signals, cannot provide angle-of-arrival information, does not support geolocation of intended and unintended targets, and has limited range and data rates due to low aperture gain. 2D active electronically scanned array (AESA)-based directional communication employs complex discovery algorithms that are vulnerable to jammers. Furthermore, for some platforms such as unmanned aerial vehicles, AESAs require a disproportionate amount of space and power, and add weight. Planar AESAs have a limited field of view, so hemispherical and spherical applications require multiple panels to achieve the required beam coverage with numerous active switching elements.

It would be advantageous to have a low weight, low drag system that enabled ultra-wide band communications.

SUMMARY

In one aspect, embodiments of the inventive concepts disclosed herein are directed to an antenna having multiple pillbox antenna structures arrange in a circle to cover the horizon. Each pillbox antenna structures includes a reflector configured to widen the resulting beam so that neighboring pillbox antenna structures produce beams that interact to more fully cover the horizon.

In a further aspect, a feed layer includes transmit/receive modules that are configured to apply amplitude and phase modulations to input signals for each pillbox antenna structure. Amplitude and phase modulations enable constructive and destructive interference between neighboring pillbox antenna structures to enhance the resulting beam or create nulls to exclude interfering signals.

In a further aspect, sets of pillbox antenna structures are stacked and angularly offset to correct crossover sectors. Alternatively, or in addition, sets of pillbox antenna structures may be adapted to operate in different, distinct frequency bands.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
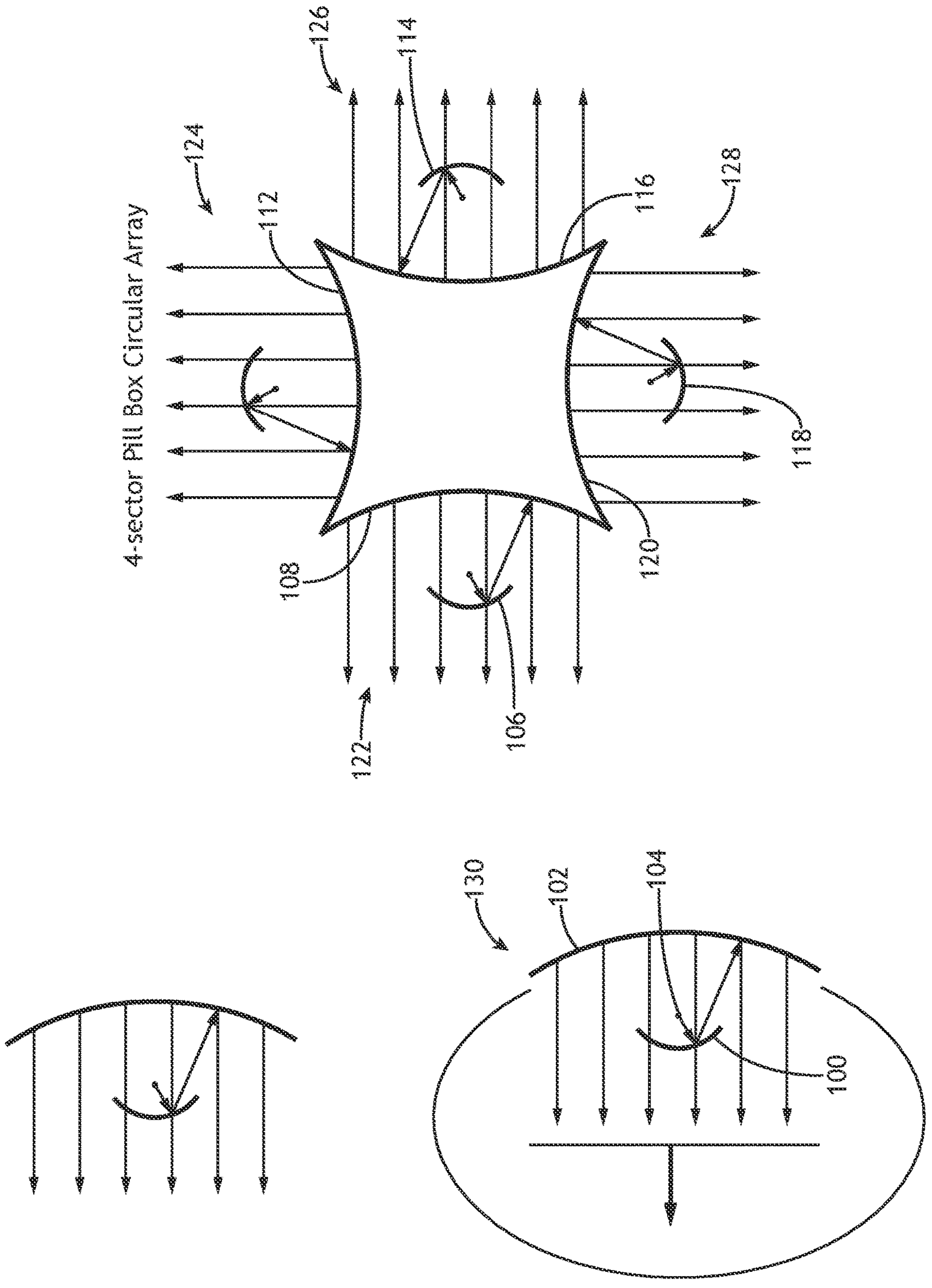
FIG. 1 shows block diagrams of pillbox antennas according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an antenna array having multiple pillbox antenna structures arrange in a circle to cover the horizon. Each pillbox antenna structures includes a reflector configured to widen the resulting beam so that neighboring pillbox antenna structures produce beams that interact to more fully cover the horizon. In one embodiment all antennas are turned on simultaneously to act as an omni directional antenna. In the other case, each pillbox antenna is turned on individually to switch beam pointing angles. A feed layer may include transmit/receive modules that are configured to apply amplitude and phase modulations to input signals for each pillbox antenna structure. Amplitude and phase modulations enable constructive and destructive interference between neighboring pillbox antenna structures to enhance the resulting beam or create nulls to exclude interfering signals. Sets of pillbox antenna structures may be stacked and angularly offset to correct crossover sectors. Alternatively, or in addition, sets of pillbox antenna structures may be adapted to operate in different, distinct frequency bands or transmit/receive mode.

Referring to FIG. 1, block diagrams of pillbox antennas 130 according to an exemplary embodiment are shown. Pillbox antennas 130 include a feed element 104 disposed to produce signals that may be reflected via a first reflector 100; the resulting signals are reflected via a parabolic reflector 102 to produce a planar wave.

In at least one embodiment, an omnidirectional antenna includes a plurality of pillbox structures 122, 124, 126, 128. The pillbox structures 122, 124, 126, 128 may be disposed periodically about an axis; for example, four pillbox structures 122, 124, 126, 128 may be disposed about an axis, offset by 90° from each other. Each pillbox structure 122, 124, 126, 128 includes a feed element and feed element reflector 106, 110, 114, 118, and a second reflector 108, 112, 116, 120 disposed so that each second reflector 108, 112, 116, 120 covers some arc of the area around the axis. While the second reflector 108, 112, 116, 120 generally corresponds to the parabolic reflector 102 in its disposition with respect to the feed element reflector, the second reflectors 108, 112, 116, 120 of the pillbox structures 122, 124, 126, 128 may be shaped to produce a wider beam than is generally produced by a traditional pillbox antenna 130. Alternatively, or in addition, the spatial relationship between the feed element reflector 106, 110, 114, 118 and the second reflector 108, 112, 116, 120 may be shorter that traditional pillbox antennas 130 to produce a wider beam (as opposed to the highly constrained directional beam of traditional pillbox antennas 130).

Each pillbox structure 122, 124, 126, 128 may be fed independently to produce selectively directional signals or, when all pillbox structures 122, 124, 126, 128 are fed, the system produces an omnidirectional signal. A feed layer for the pillbox structures 122, 124, 126, 128 may include switching elements to feed one or more of the pillbox structures 122, 124, 126, 128 independently.

In at least one embodiment, the pillbox structures 122, 124, 126, 128 may be disposed and operated at wavelengths such that neighboring beams may interact via constructive and destructive interference. Such constructive and destructive interference may enable beam control (i.e., radiation pattern synthesis and/or number of beams) not otherwise possible with pillbox antennas 130.

Each pillbox structure 122, 124, 126, 128 may be fed signals with distinct phase relationships to enable constructive and/or destructive interference of the corresponding beams to further enhance the omnidirectional nature of the beams, especially at the interface between pillbox structures 122, 124, 126, 128.

Simulations show that the second reflector 108, 112, 116, 120 may be flattened (i.e., the curvature enlarged to produce a wide beam) to produce about 85° of coverage without compromising the resulting beam due to spillover and scattering.

In at least one embodiment, the pillbox structures 122, 124, 126, 128 may comprise plated plastic filled with air. Alternatively, the arcs of the pillbox structures 122, 124, 126, 128 may be embodied in a printed circuit board as an array of vias (i.e., substrate integrated waveguide, as described within the literature). In either case, the aperture side of the pillbox structure 122, 124, 126, 128 may be flared to adjust beam width and gain.

A pillbox radiating element functions as a parallel plate waveguide radiator that has a DC cut off frequency in a transverse electromagnetic mode with aperture height effects matching into free space, adjustable by aperture flare/shaping. In contrast, the height of a Circular Parasitic Array (aka CPA) is fundamentally a ¼ wave monopole in free space, which is 3 inches tall at 1.0 GHz. Each pillbox structure 122, 124, 126, 128 may be conceptualized as a one-dimensional prime focus or Cassegrain/Gregorian cylindrical or parabolic reflector antenna. Parallel plate waveguide pillboxes have high radiating efficiency and broad bandwidth due to geometric optics ray collimation properties.

Figure 2:
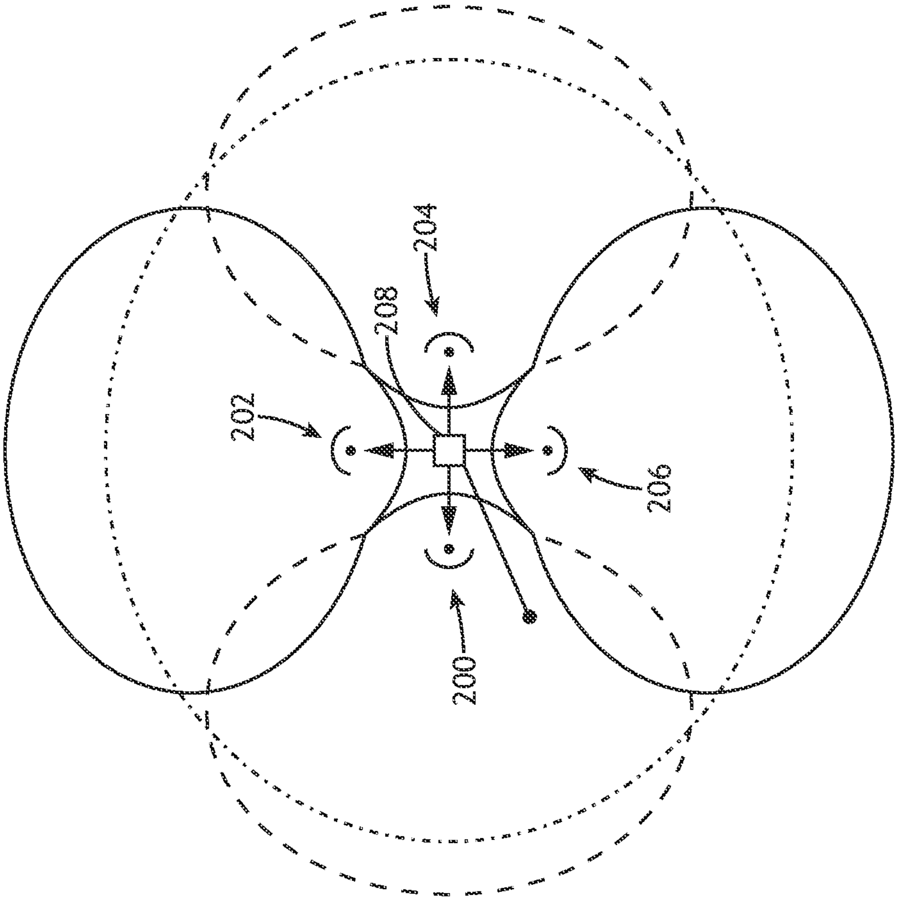
FIG. 2 shows a block diagram of an antenna according to an exemplary embodiment.

Referring to FIG. 2, a block diagram of an antenna according to an exemplary embodiment is shown. The antenna includes a plurality of pillbox structures 200, 202, 204, 206 disposed around an axis. Each pillbox structure 200, 202, 204, 206 may include a feed element reflector and a second reflector having a curvature to produce a beam such that the beams of neighboring pillbox structures 200, 202, 204, 206 intersect or overlap.

Traditional parasitic arrays having a single monopole and a set of periphery parasitic elements require a switching diode for each parasitic element. In some applications (i.e., CPA), 32 or more switching elements may be necessary with a corresponding demand for DC power. In at least one embodiment, an antenna including pillbox structures 200, 202, 204, 206 may require four switching elements. Furthermore, embodiments of the present disclosure may be smaller in height than a monopole antenna and an array of parasitic elements, particularly for S band and below frequencies.

It may be appreciated that while four sectored antennas are shown herein, antennas with more than four sectors are envisioned. More sectors (i.e., more pillbox structures 200, 202, 204, 206) may increase the diameter of the antenna.

Figure 3:
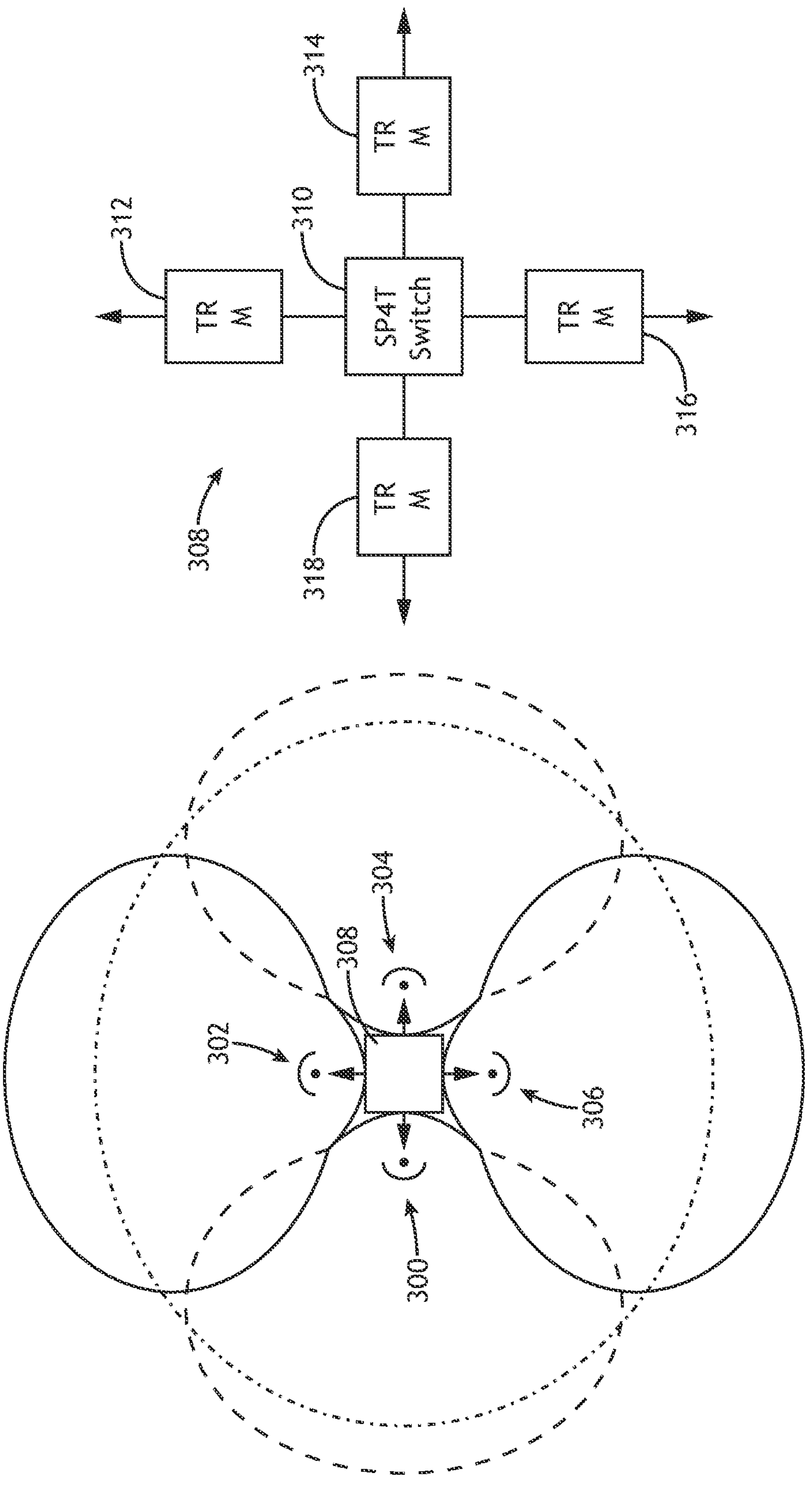
FIG. 3 shows a block diagram of an antenna according to an exemplary embodiment.

Referring to FIG. 3, a block diagram of an antenna according to an exemplary embodiment is shown. The antenna includes a plurality of pillbox structures 300, 302, 304, 306 disposed around an axis. Each pillbox structure 300, 302, 304, 306 may include a feed element reflector and a second reflector having a curvature to produce a beam such that the beams of neighboring pillbox structures 300, 302, 304, 306 intersect or overlap.

A feed element 308 driving the pillbox structures 300, 302, 304, 306 may include a set of switches 310 and a transmit/receive module 312, 314, 316, 318, each corresponding to one of the pillbox structures 300, 302, 304, 306. The transmit/receive modules apply phase (and amplitude) adjustments to the signals of the corresponding pillbox structure 300, 302, 304, 306. Phase control enables the side lobe adjustment and beam width control when operating in an omnidirectional mode in accordance to circular antenna array phase-mode theory, as described in the literature. For example, the transmit/receive modules 312, 314, 316, 318 may apply a phase progression to alter properties of the resulting omnidirectional signal.

In at least one embodiment, the switches 310 and transmit/receive modules 312, 314, 316, 318 may comprise RF integrated circuits for element level amplitude and phase weighting; amplitude weighting enables side lobe adjustment and beam width adjustment. Such switching enables sector switching, azimuth beam steering, azimuth nulling, phase modal excitation.

Figure 4:
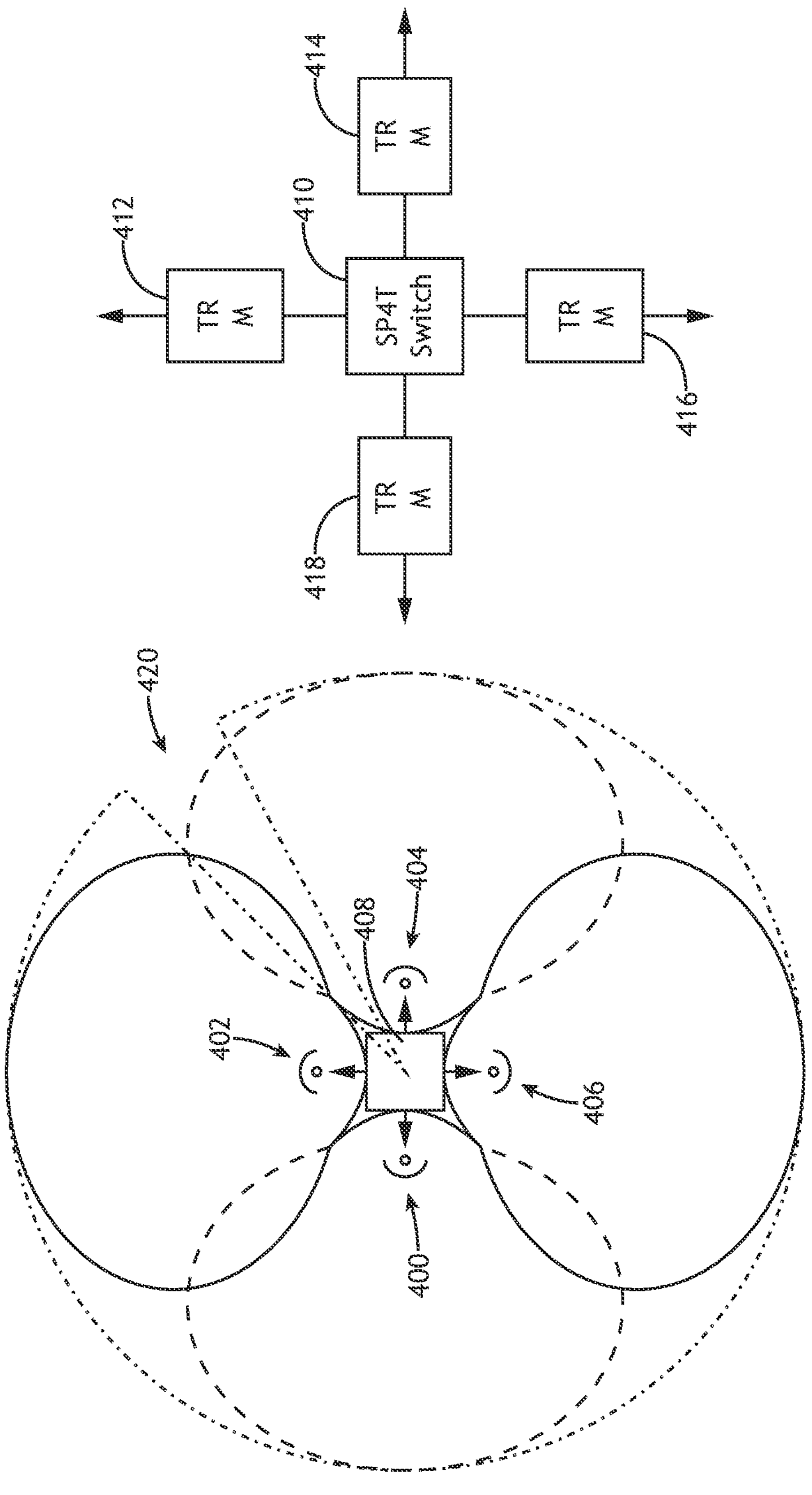
FIG. 4 shows a block diagram of an antenna according to an exemplary embodiment.

Referring to FIG. 4, a block diagram of an antenna according to an exemplary embodiment is shown. The antenna includes a plurality of pillbox structures 400, 402, 404, 406 disposed around an axis. Each pillbox structure 400, 402, 404, 406 may include a feed element reflector and a second reflector having a curvature to produce a beam such that the beams of neighboring pillbox structures 400, 402, 404, 406 intersect or overlap. A feed element 408 driving the pillbox structures 400, 402, 404, 406 may include a set of switches 410 and a transmit/receive module 412, 414, 416, 418, each corresponding to one of the pillbox structures 400, 402, 404, 406 to apply phase adjustments.

In at least one embodiment, set of switching elements 410 and transmit/receive modules 412, 414, 416, 418 may alter the amplitude and phase of input signals to each pillbox structure 400, 402, 404, 406 to produce a null 420. Amplitude and phase adjustment specific to each pillbox structure 400, 402, 404, 406 may enable as one fewer null 420 than the number of pillbox structures 400, 402, 404, 406 to address interference such as jamming signals. The determination of amplitude and phase adjustments in real-time may require additional processing elements as well as data corresponding to the position of such interference sources.

Figure 5:
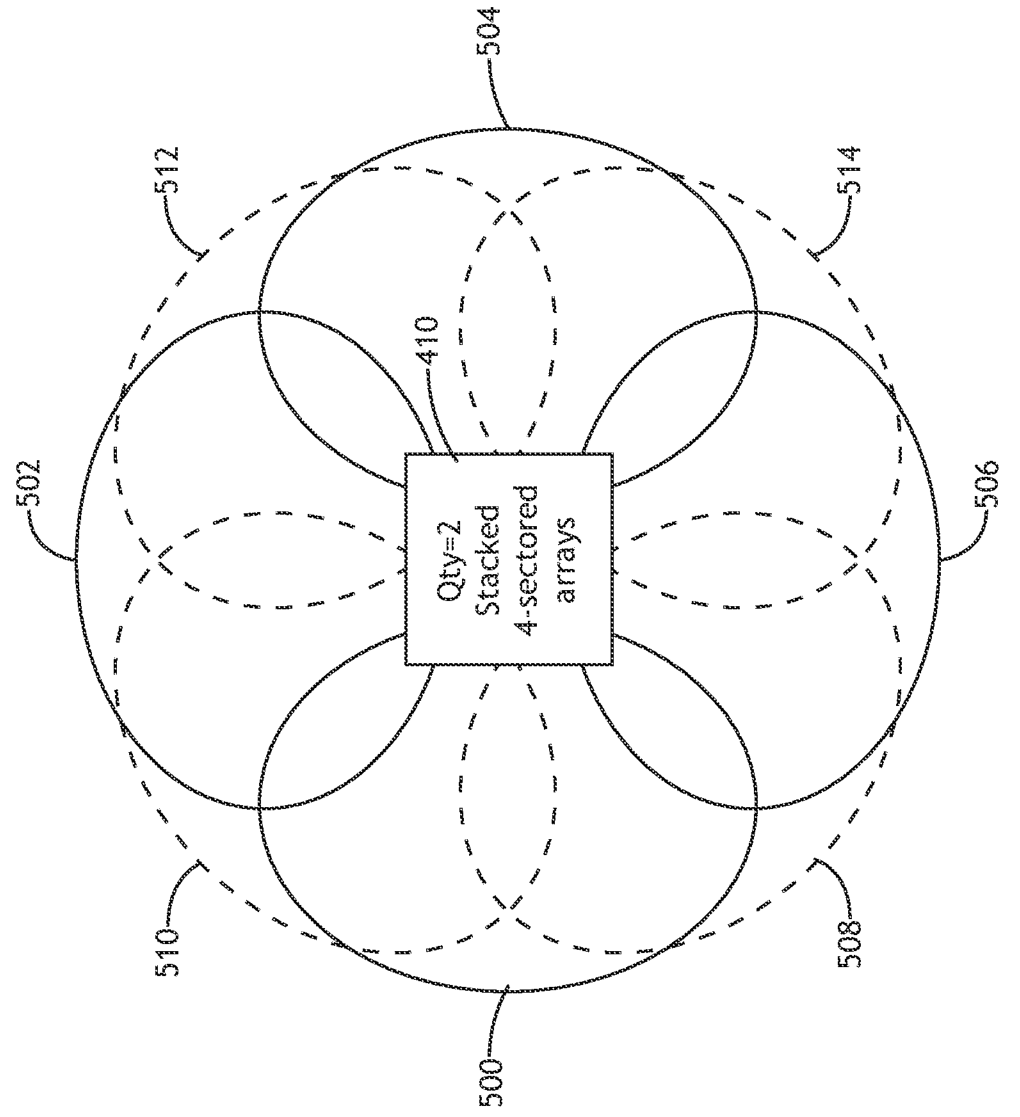
FIG. 5 shows a block diagram of an antenna according to an exemplary embodiment.

Referring to FIG. 5, a block diagram of an antenna according to an exemplary embodiment is shown. The antenna includes a first set of pillbox structures creating radiation patterns 500, 502, 504, 506 disposed around an axis, and a second set of pillbox structures creating radiation patterns 508, 510, 512, 514 disposed around the axis and linearly offset along the axis from the first set of pillbox structures 500, 502, 504, 506 (i.e., the sets of pillbox structures are staked vertically to support different frequency or transmit/receive duality).

In at least one embodiment, the second set of pillbox structures 508, 510, 512, 514 is angularly offset from the first set of pillbox structures 500, 502, 504, 506. For example, the second set of pillbox structures 508, 510, 512, 514 may be rotated 45°. For each set pillbox structures, neighboring pillbox structures define crossover sectors where beams overlap and are relatively weak. Rotating the sets of pillbox structures with respect to each other allows such crossover sectors to be staggered. The resulting angularly offset beams may be blended via backend processing elements 516 for a lower omni ripple and smoother radiation pattern. In at least one embodiment, where the pillbox structures 500, 502, 504, 506, 508, 510, 512, 514 comprise substrate integrated waveguides, the overall height of the stacked antenna may be low.

Figure 6:
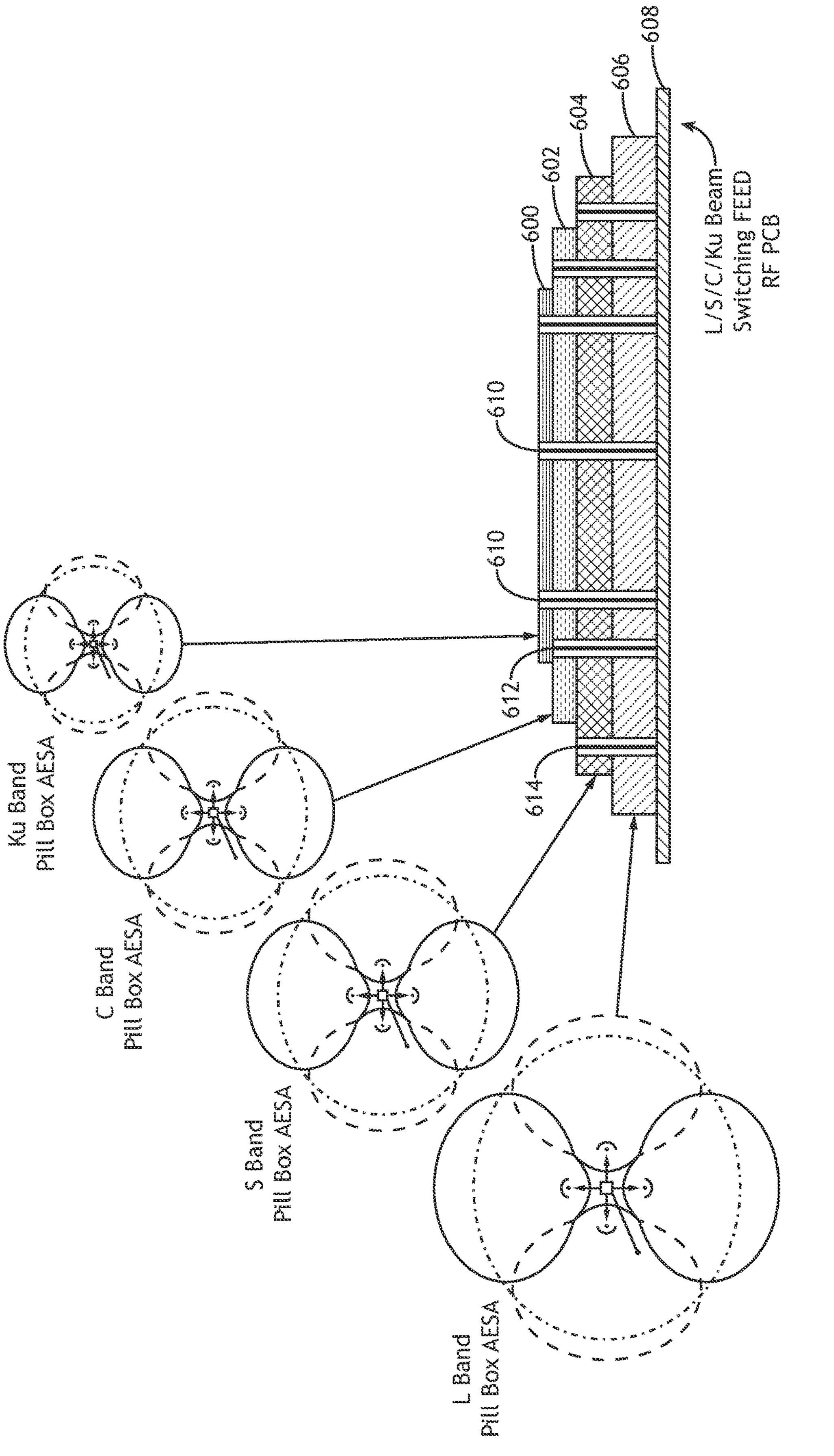
FIG. 6 shows a block diagram of an antenna according to an exemplary embodiment.

Referring to FIG. 6, a block diagram of an antenna according to an exemplary embodiment is shown. The antenna includes a plurality of stacked sets of pillbox structures 600, 602, 604, 606. Each set of pillbox structures 600, 602, 604, 606 is dimensionally optimized and configured to operate in a separate, distinct frequency band. For example, a first set of pillbox structures 600 may be configured to operate in the Ku band, a second set of set of pillbox structures 602 may be configured to operate in the C band, a third set of pillbox structures 604 may be configured to operate in the S band, and a fourth set of pillbox structures 606 may be configured to operate in the L band.

In at least one embodiment, the antenna may include a feed layer 608 including a plurality of switches and transmit/receive modules. The switches and transmit/receive modules may be in electronic communication with the various sets of pillbox structures 600, 602, 604, 606 via vias 610, 612 that may be uniquely associated with a pillbox structure to minimize power and maximize frequency bandwidth. In at least one embodiment, rigid coaxial cable structures 610, 612, 614 may be generally disposed to passthrough the paraboloid antenna walls of the pillbox structures to minimize parasitic effects.

Pillbox structures are self-shielding. Placing sets of pillbox structures 600, 602, 604, 606 configured for differing frequencies on top of each other does not induce first order effect radiation performance or impedance matching. In at least one embodiment, each set of pillbox structures 600, 602, 604, 606 may have local ground plane sloping and/or aperture flaring to create fixed, but shaped elevation patterns.

Pillbox structures configured to operate in general as essentially parallel plate waveguide radiators in a transverse-electromagnetic mode (TEM) and have a DC cut-off frequency. Aperture height effects matching into free space, which can be adjusted by aperture flare/shaping.

Figure 7:
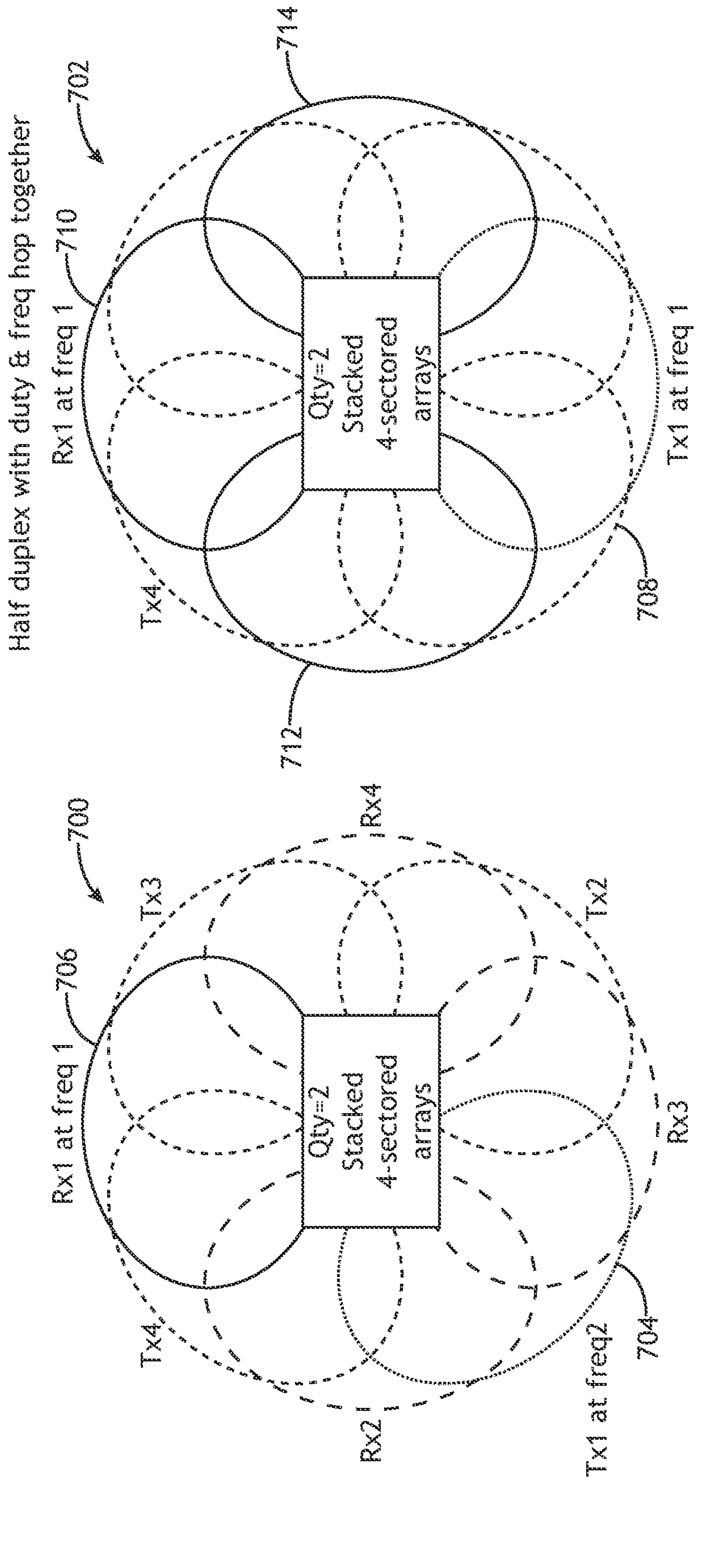
FIG. 7 shows radiation patterns of a stacked antenna with separate sets of pillbox structures.

Referring to FIG. 7, radiation patterns 700, 702 of a stacked antenna with separate sets of pillbox structures are shown. Where the antenna includes stacked, angularly offset sets of pillbox structures, a feed layer may configure the pillbox structures such that a first set of pillbox structures is configured for transmission while a second set of pillbox structures is configured for reception. In at least one embodiment, transmit and receive beams may be isolated by rotation such that a first transmit beam 704 is offset from a first receive beam 706.

In at least one embodiment, individual pillbox structures within sets of pillbox structures may be configured, via the corresponding feed layer, for either a transmission beam 708 or a receive beam 710, 712, 714. Designated transmit pillbox structures and receive pillbox structures may be angular offset between stacked sets of pillbox structures. Such configuration may produce a radiation pattern 702 where transmission and reception may be isolated by time delay, Time Division Multiplexing (TDM) the various antenna structures, and frequency hopping. Alternatively, it is possible to enable full duplex operation if the transmit and receive beams do not point in the same direction, which minimizes parasitic transmit-to-receive mutual coupling, which in turn prevents receiver de-sensing or even destruction receiver circuitry damage that can be caused my excessive RF energy exciting the receiver behind its respective pill box antenna.

Figure 8:
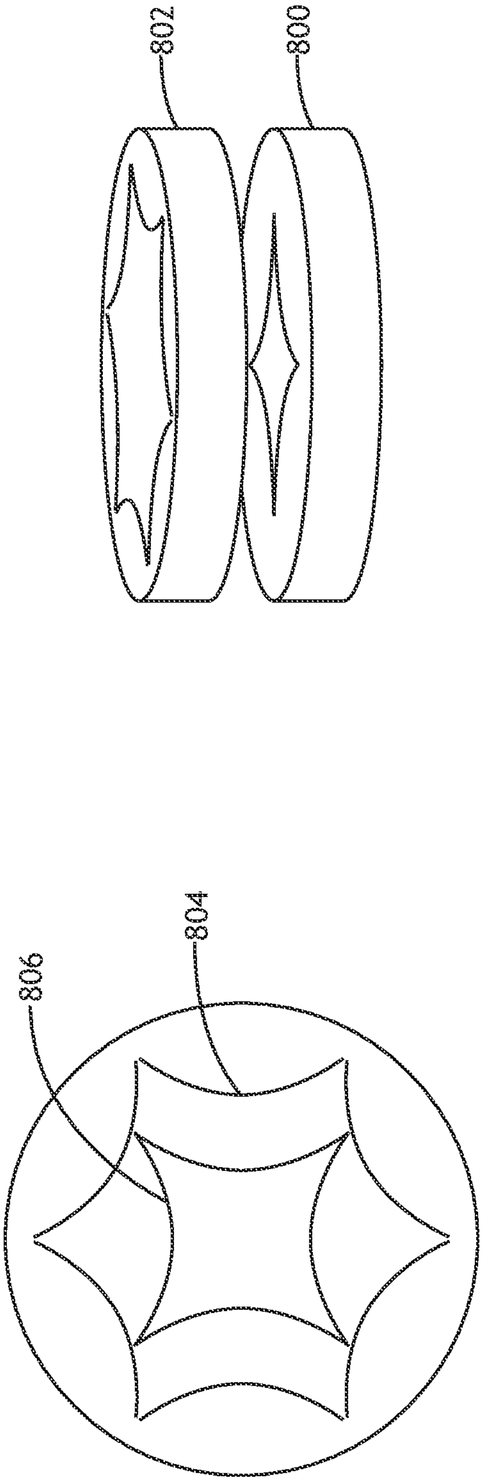
FIG. 8 shows a block diagram of an antenna with stacked pillbox structures.

Referring to FIG. 8, a block diagram of an antenna with stacked sets of pillbox structures 800, 802 is shown. Where the antenna includes stacked, separate sets of pillbox structures 800, 802, a first set of pillbox structures 800 may include pillbox structures 804 configured for low frequency operation and a second set of pillbox structures 802 may include pillbox structures 806 configured for high frequency operation. Individual pillbox structures 804, 806 may be configured to produce modified beam sectors with individual controllable beam width and position. Furthermore, gain and null variation is possible. It may be appreciated that while two sets of stacked pillbox structures 800, 802 are shown, more than two stacked layers are envisioned.

Embodiments of the present disclosure enable broad, multi-band, full duplex operation for different transmit/receive frequency bands. A feed layer with fast switching (e.g., RF) enables frequency hopping, transmit/receive switching, and beam switching. Depending on the number of sectors in a stack, gain, beamwidth, and beam nulls may be altered. Embodiments of the present disclosure require significantly fewer switches than parasitic array antennas with equivalent capabilities, and utilizes less complex beam steering electronics.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An antenna comprising:
a plurality of pillbox structures, each including:
at least one radiating element;
a first reflector disposed to reflect a signal from the radiating element; and
a second reflector disposed to reflect the signal from the first reflector, the second reflector being a parabolic reflector configured to produce a planar wave;
a plurality of switches, each associated with a pillbox structure in the plurality of pillbox structures; and
a plurality of transmit/receive modules, each associated with a pillbox structure in the plurality of pillbox structures,
wherein:
the plurality of pillbox structures are disposed around an axis.

2. The antenna of claim 1, wherein the first reflector and second reflector of each pillbox structure are disposed and configured to produce a beam defining a crossover sector with beams of neighboring pillbox structures.

3. The antenna of claim 2, wherein each transmit/receive module is configured to apply an amplitude adjustment and a phase adjustment to the associated pillbox structure.

4. The antenna of claim 3, wherein the amplitude adjustments and phase adjustments are configured to produce one or more nulls in a resulting beam.

5. The antenna of claim 1, wherein the plurality of pillbox structures comprises a first set of pillbox structure; the antenna further comprising a second set of pillbox structures disposed around the axis, linearly and angularly offset from the first set of pillbox structures.

6. The antenna of claim 5, wherein the second set of pillbox structures is angularly offset from the first set of pillbox structures by 45°.

7. The antenna of claim 5, wherein the first set of pillbox structures and second set of pillbox structures are configured to operate in distinct and separate frequency bands.

8. A communication system comprising:
an antenna comprising:
a plurality of pillbox structures, each including:
at least one radiating element;
a first reflector disposed to reflect a signal from the radiating element; and
a second reflector disposed to reflect the signal from the first reflector, the second reflector being a parabolic reflector configured to produce a planar wave; and
a feed layer comprising:
a plurality of switches, each associated with a pillbox structure in the plurality of pillbox structures; and
a plurality of transmit/receive modules, each associated with a pillbox structure in the plurality of pillbox structures,
wherein:
the plurality of pillbox structures are disposed around an axis.

9. The communication system of claim 8, wherein the first reflector and second reflector of each pillbox structure are disposed and configured to produce a beam defining a crossover sector with beams of neighboring pillbox structures.

10. The communication system of claim 9, wherein each transmit/receive module is configured to apply an amplitude adjustment and a phase adjustment to the associated pillbox structure.

11. The communication system of claim 10, wherein the amplitude adjustments and phase adjustments are configured to produce one or more nulls in a resulting beam.

12. The communication system of claim 8, wherein the plurality of pillbox structures comprises a first set of pillbox structures; the antenna further comprising a second set of pillbox structures disposed around the axis, linearly and angularly offset from the first set of pillbox structures.

13. The communication system of claim 12, wherein the second set of pillbox structures in angularly offset from the first set of pillbox structures by 45°.

14. The communication system of claim 12, wherein the first set of pillbox structures and second set of pillbox structures are configured to operate in distinct and separate frequency bands.

15. An omnidirectional communication system comprising:
an antenna comprising at least two stacked layers:
a first layer comprising a first set of pillbox structures, each including:
at least one radiating element;
a first reflector disposed to reflect a signal from the radiating element; and
a second reflector disposed to reflect the signal from the first reflector, the second reflector being a parabolic reflector configured to produce a planar wave;
a second layer comprising a second set of pillbox structures, each including:
at least one radiating element;
a first reflector disposed to reflect a signal from the radiating element; and
a second reflector disposed to reflect the signal from the first reflector, the second reflector being a parabolic reflector configured to produce a planar wave; and
a feed layer comprising:
a plurality of switches, each associated with a pillbox structure in the first set of pillbox structures or the second set of pillbox structures; and a plurality of transmit/receive modules, each associated with a pillbox structure in the first set of pillbox structures or the second set of pillbox structures, wherein:

the first set of pillbox structures are disposed around an axis and with a first surface proximal to the feed layer and a second surface distal to the feed layer; and the second set of pillbox structures are disposed around the axis and with a first surface proximal to the second surface of the first set of pillbox structures.

16. The omnidirectional communication system of claim 15, wherein:

the first set of pillbox structures are configured to operate in a first frequency range; and the second set of pillbox structures are configured to operate in a second frequency range distinct from the first frequency range.

17. The omnidirectional communication system of claim 16, wherein:

the first frequency range is configured for a first beamwidth; and the second frequency range is configured for a second beamwidth narrower than the first beamwidth.

18. The omnidirectional communication system of claim 15, wherein the plurality of switches are radio frequency (RF) switches.

19. The omnidirectional communication system of claim 18, wherein:

the first set of pillbox structures is configured to transmit; and the second set of pillbox structures is configured to receive.

* * * * *